Nov. 6, 1945.                    O. KRASTEL                    2,388,422
                            PISTON CONSTRUCTION
                            Filed Oct. 2, 1943
Fig. 1.
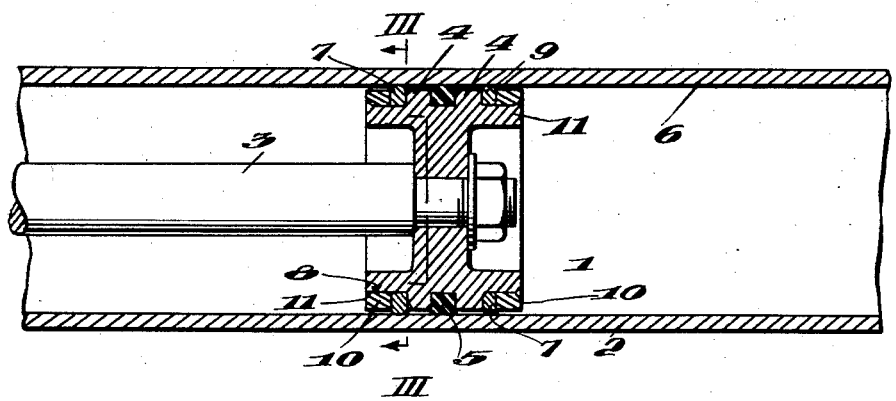
Fig. 2.
Fig. 3.
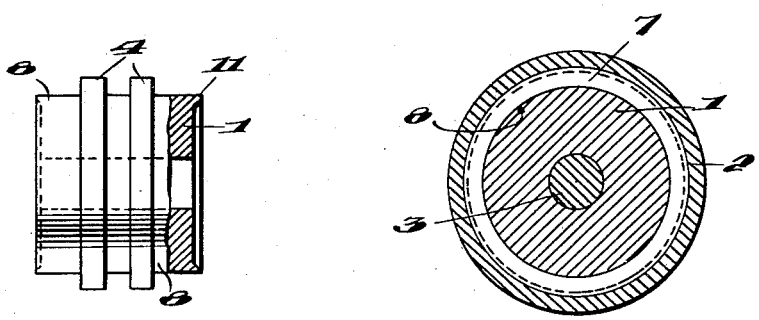
Fig. 4.
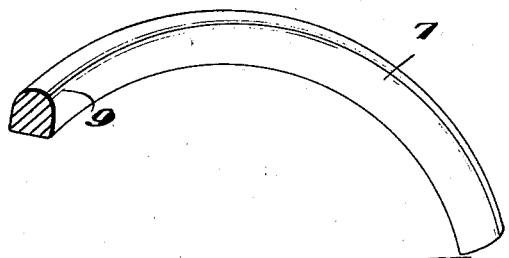
Inventor
Oscar Krastel,
By W. D. McDowell
Attorney Patented Nov. 6, 1945

2,388,422

UNITED STATES PATENT OFFICE 2,388,422

PISTON CONSTRUCTION

Oscar Krastel, Columbus, Ohio

Application October 2, 1943, Serial No. 504,771

6 Claims. (Cl. 309—4)

This invention relates to improvements in pistons and the object of the invention is to provide a piston which, in operation, will not score or produce undue wear on the inner wall surfaces of an associated cylinder.

In hydraulic controls, particularly struts or jacks, used in the operation of various airplane parts and accessories, it is customary to employ aluminum cylinders in which aluminum pistons are closely fitted for sliding movement under hydraulic pressures. Due to the inherent characteristics of aluminum, or alloys thereof, the inner walls of said cylinders, after a comparatively short period of use, become scored or unevenly worn, causing loss of hydraulic pressure and the formation of loose metallic particles, which obstruct passages or ports of small diameter, causing such controls to lose effectiveness, or, under certain conditions, to become inoperative.

To overcome, minimize and improve such conditions, the present invention provides a lightweight piston in which the outer wall surfaces thereof are maintained in spaced relation from the inner wall surfaces of an associated lightweight cylinder by the provision of annular piston rings of steel, bronze or the like, the latter having rounded outer edges which project beyond the outer circumferential surfaces of the piston to have a close-fitting engagement with the cylinder walls, the formation of the piston rings being such that when the piston is reciprocated, the rings will not score or cause the cylinder walls to wear unduly, but on the contrary will tend to burnish the cylinder walls, rendering the same hard and smooth, and precluding the seepage of fluid, under pressure, between the piston and cylinder walls.

For a further understanding of the invention, reference is to be had to the following description and the accompanying drawing, wherein:

Fig. 1 is a vertical sectional view taken longitudinally through a piston formed in accordance with the present invention;

Fig. 2 is a side elevational view of the piston body, its associated rings being omitted;

Fig. 3 is a vertical transverse sectional view, the plane of the figure being indicated by the line III—III of Fig. 1;

Fig. 4 is a perspective view of one of the antiscore rings of the piston.

Referring more particularly to the drawing, the numeral 1 designates the body of a piston formed in accordance with the present invention. When used in the manufacture of hydraulic airplane controls, the body 1 is formed from a lightweight metal, such as an alloy of aluminum, and the piston is adapted to be mounted for sliding movement in a cylinder 2, the latter being, also, formed from a corresponding lightweight metal. The center of the body 1 is provided with an axial opening adapted, as usual, for the reception of one end of a piston rod 3.

Exteriorly, the central region of the body 1 is formed with integral spaced collars 4—4 which provide between them an annular groove for the reception of a packing ring 5, the latter being formed from a non-metallic material, such as leather, fiber, synthetic rubber or the like, the outer surfaces of the rings 5 being disposed in close-fitting engagement with the inner wall surfaces 6 of the cylinder 2, while the outer circumferential surfaces of the collars 4 are slightly spaced from the surfaces 6, as shown in Fig. 1.

The anti-score properties of the piston forming the present invention are secured by the provision of a plurality of guide rings 7. These rings are non-split or of true annular formation. The inside diameter of each of the rings 7 is such that the same must be driven by force on the outer cylindrical portions 8 of the piston body 1 until the rings are seated against the outer side surfaces of the collars 4. The outside diameter of each of the rings 7 exceeds the corresponding diameters of the collars 4, so that said rings 7 will possess close-fitting sliding engagement with the inner wall surfaces 6 of the cylinder 2. Preferably, the rings 7 are formed from carburized and hardened open hearth steel, although I reserve the right to employ other metals in their composition such, for example, as bronze. The outer surfaces of each of the rings 7 are rounded as at 9 so that there will be but limited contact area between said rings and the cylinder wall.

To positively retain the rings 7 in their operative positions, initially separate securing collars 10 are forced over the outer portions 8 of the piston body 1, the separate collars 10 cooperating with the fixed collars 4 of the piston to form annular grooves in which the rings 7 are confined. To retain the collars 10 against movement, the outer ends of the body 1 may be swedged or peened over, as at 11, thereby causing the collars 10 to exert a clamping action on the sides of the guide rings 7.

The collars 10 are likewise formed from an aluminum alloy, and their outer circumferences are such that the peripheral walls thereof will not contact the cylinder surfaces 6. A piston so formed may be used indefinitely in hydraulic airplane control under ordinary conditions of use and operation without scoring or otherwise injuring the cylinder walls, thereby overcoming a condition which has been the source of considerable concern to manufacturers of controls of the character indicated. My improved piston is comparatively simple to manufacture and does not add appreciably to its cost.

While a single embodiment of my improved piston has been illustrated and specifically described, nevertheless it will be understood that the same is subject to certain structural modification without departing from the fundamental principles of the invention. For example, while a pair of the guide rings has been shown, it will be understood that any desired number of such rings may be employed. Therefore, I reserve the right to employ all such modifications of my invention falling within the scope of the following claims.

Having thus described my invention, I claim:

1. A piston adapted for sliding movement in a fluid-receiving cylinder composed substantially of aluminum, said piston comprising a body formed substantially of aluminum, a plurality of spaced annular grooves provided in the outer wall of said piston body, a non-metallic packing ring positioned in one of said grooves, and a plurality of unbroken annular guide rings positioned in the remainder of said grooves, said guide rings being formed from a metal possessing greater hardness than the metal composing said cylinder and piston, each of said guide rings possessing a greater diameter than said piston body, whereby the outer surfaces of said guide rings have a close fitting sliding engagement with the inner wall surfaces of said cylinders and space the outer surfaces of the piston body from said cylinder surfaces, the outer peripheral portion of each of said guide rings being rounded in cross section to limit the contact area thereof with said cylinder surfaces.

2. A piston adapted for sliding movement in a cylinder composed substantially of a lightweight relatively soft metal, said piston comprising a body composed of a metal having substantially the same characteristics as that from which the cylinder is formed, the outer circumferential wall of said piston being annularly grooved, a non-metallic packing positioned in one of said grooves, and a piston ring positioned in another of said grooves and confined against movement longitudinally of the piston, said ring being formed from metal possessing greater hardness and resistance to wear than the metal from which the piston and cylinder are formed, said ring possessing a greater diameter than that of said piston and having a close-fitting sliding engagement with the inner wall surfaces of said cylinder, whereby to space the outer circumferential surfaces of the piston body from said cylinder surfaces, the outer peripheral surface of said ring being substantially rounded in cross section to limit the area of engagement of said ring with said cylinder surfaces.

3. A piston adapted for sliding movement in a cylinder formed from a relatively lightweight and soft metal alloy, said piston comprising a body formed from a metal alloy substantially corresponding to that of the cylinder, said piston having integrally formed therewith a pair of collars defining between them an annular groove, an annular non-metallic packing positioned in said groove, a plurality of annular guide rings engaged with the outer surfaces of said collars and surrounding the piston body, said guide rings being formed from a metal possessing greater hardness and wear resistance than the metals from which said piston and cylinder are formed, said guide rings possessing a greater diameter than said collars, whereby to maintain a close fitting sliding engagement between the outer surfaces of said rings and the inner wall surfaces of said cylinder and spacing the collars from the cylinder surfaces, and initially separate collars applied to the ends of said piston and spaced from the cylinder wall, said latter collars being secured to the body of said piston to confine the guide rings in grooves formed between said integral and initially separate collars.

4. A piston for use in hydraulic control mechanism comprising a body formed from a relatively lightweight and soft metal alloy, said body having integrally formed therewith a pair of collars extending around its outer periphery and defining between them an annular groove, an annular non-metallic packing positioned in said groove, a plurality of annular guide rings engaged with the outer surfaces of said collars and surrounding the piston body, said guide rings being formed from a metal possessing greater hardness and wear resistance than the metal from which said piston body is formed, said guide rings possessing a greater diameter than said collars, whereby to maintain a close-fitting sealing engagement between the outer surfaces of said rings and the inner wall surfaces of an associated cylinder, and initially separate collars applied to the ends of said piston and conforming to the outer diameter of said first-named collars, said initially separate collars being secured to the body of said piston to confine the guide rings in grooves formed between said integral and initially separate collars.

5. A piston comprising a body formed from a relatively light weight and soft metal alloy, the outer wall of said body being formed with longitudinally spaced annular grooves, an annular cylinder wall engaging non-metallic packing positioned in one of said grooves, metallic annular guide means positioned in another of said grooves, said guide means being formed from a metal possessing greater hardness and wear resistance than the metal from which the piston body is formed and having a greater outside diameter than said body, whereby to maintain a close-fitting sliding engagement between the same and the inner wall surfaces of an associated cylinder and spacing the body of the piston from the adjoining cylinder surfaces, and an initially separate holding collar surrounding the piston body at one end for retaining said guide means against movement longitudinally of said piston body, said collar possessing a smaller outside diameter than said guide means.

6. Piston construction as defined in claim 5 and wherein said annular metallic guide means is formed with rounded surfaces for cylinder wall engagement.

OSCAR KRASTEL.